US011323610B2

United States Patent
Yoon et al.

(10) Patent No.: US 11,323,610 B2
(45) Date of Patent: May 3, 2022

(54) AUTOFOCUS METHOD AND ELECTRONIC DEVICE PERFORMING SAME

(71) Applicant: Samsung Electronics Co., Ltd., Suwon-si (KR)

(72) Inventors: Kyunghoon Yoon, Suwon-si (KR); Jaehyoung Park, Suwon-si (KR); Jeongki Kim, Suwon-si (KR); Kyongtae Park, Suwon-si (KR); Jonghoon Won, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/279,865

(22) PCT Filed: Sep. 18, 2019

(86) PCT No.: PCT/KR2019/012070
§ 371 (c)(1),
(2) Date: Mar. 25, 2021

(87) PCT Pub. No.: WO2020/067674
PCT Pub. Date: Apr. 2, 2020

(65) Prior Publication Data
US 2022/0038636 A1 Feb. 3, 2022

(30) Foreign Application Priority Data

Sep. 28, 2018 (KR) .......................... 10-2018-0115708

(51) Int. Cl.
*H04N 5/232* (2006.01)
*G03B 13/36* (2021.01)

(52) U.S. Cl.
CPC ....... *H04N 5/232123* (2018.08); *G03B 13/36* (2013.01)

(58) Field of Classification Search
CPC .......................... H04N 5/232123; G03B 13/36
See application file for complete search history.

(56) References Cited

U.S. PATENT DOCUMENTS

| 8,422,878 B2 | 4/2013 | Park et al. |
| 10,044,959 B2 | 8/2018 | Galor Gluskin |

(Continued)

FOREIGN PATENT DOCUMENTS

| JP | 2007-139893 A | 6/2007 |
| JP | 4727534 B2 | 7/2011 |

(Continued)

*Primary Examiner* — Shahbaz Nazrul
(74) *Attorney, Agent, or Firm* — Jefferson IP Law, LLP

(57) ABSTRACT

An electronic device according to various embodiments of the present invention may comprise: a camera including a lens assembly having one or more lenses, and a driving unit that can adjust focus by moving at least some of the lenses (a portion of the lenses) of the lens assembly; a memory; and a processor operatively connected to the lens assembly, the camera, and the memory. According to one embodiment, the processor can adjust the focus of an external object by: using the camera to obtain a first image and a second image of the external object, the first image corresponding to a first position of the portion of the lenses and the second image corresponding to a second position of the portion of the lenses; using the first image and the second image to determine conditions related to contrast characteristics of the external object; using the first image, the second image, and a designated point spread function to determine a first movement direction and the amount of movement of the portion of the lenses on the basis of the conditions satisfying a designated first condition; and moving the portion of the lenses according to the determined first movement direction and the determined amount of movement. According to one embodiment, the processor uses the contrast difference between the external object included in the first image and the second image to determine a second movement direction of the portion of the lenses on the basis of the conditions satisfying a designated second condition, and can adjust the focus of the external object on the basis of at least the (Continued)

contrast change of one or more images obtained while moving the portion of the lenses along the determined second movement direction. Other embodiments are also possible.

15 Claims, 11 Drawing Sheets

(56) References Cited

U.S. PATENT DOCUMENTS

| | | |
|---|---|---|
| 2008/0049137 A1 | 2/2008 | Endo |
| 2008/0297648 A1 | 12/2008 | Furuki et al. |
| 2011/0150447 A1 | 6/2011 | Li |
| 2012/0057072 A1* | 3/2012 | Yamashita ....... H04N 5/232123 348/349 |
| 2013/0016275 A1 | 1/2013 | Hokoi |
| 2013/0113987 A1* | 5/2013 | Fukuda .................. G03B 13/36 348/349 |
| 2018/0077340 A1 | 3/2018 | Iwasaki |
| 2019/0222742 A1* | 7/2019 | Kim ......................... G06T 7/80 |
| 2019/0297249 A1* | 9/2019 | Kim ....................... G03B 13/36 |
| 2019/0327393 A1* | 10/2019 | Yang ...................... G06T 7/571 |

FOREIGN PATENT DOCUMENTS

| | | |
|---|---|---|
| JP | 5757099 B2 | 7/2015 |
| JP | 2016-018116 A | 2/2016 |
| JP | 6056160 B2 | 1/2017 |
| KR | 10-2011-0073245 A | 6/2011 |

* cited by examiner

AUTOFOCUS METHOD AND ELECTRONIC DEVICE PERFORMING SAME

TECHNICAL FIELD

Various embodiments of the disclosure relate to an autofocus (AF) method to control a focus of camera lenses and an electronic device performing the same.

BACKGROUND ART

A portable electronic device such as a smart phone may include at least one camera as one of constituent elements, and based on an AF method, the portable electronic device may perform image photographing through the camera. The camera may condense light incident from an outside using lenses, and may convert the condensed light into an electrical signal based on an image sensor. The electrical signal may be implemented as image data, and may be stored in a memory of the portable electronic device or may be output through a display of the portable electronic device.

The portable electronic device may obtain an image of a clear picture quality using the camera, and for this, a focus adjustment method may be an important factor. In the past, a user manually adjusted a focus corresponding to a subject, whereas at present, the camera can adjust the focus using an AF function.

DISCLOSURE OF INVENTION

Technical Problem

The autofocus (AF) function may be a focus function corresponding to the subject through movement of the lenses included in the camera back and forth. To focus on the subject may mean that the subject is under on-focused. The electronic device including the camera may be provided with the display, and may output the image being received through the camera on the display. The camera may continuously perform the AF function corresponding to the subject intended to be photographed. While the AF function of the camera is performed, the positions of the lenses may be continuously changed because of a change of the subject, and it may be necessary for the electronic device to quickly perform the AF function.

According to various embodiments, in order to quickly perform the AF function, the electronic device may adjust the focus at fast speed by running in parallel a contrast AF method and a depth from defocus (DFD) method.

Solution to Problem

According to various embodiments of the disclosure, an electronic device may include: a camera including a lens assembly including one or more lenses and a driving unit capable of adjusting a focus by moving at least some of the lenses of the lens assembly; a memory; and a processor operatively connected to the lens assembly, the camera, and the memory. According to an embodiment, the processor may obtain a first image corresponding to a first position of the at least some of the lenses and a second image corresponding to a second position of the at least some of the lenses with respect to an external object using the camera, determine conditions related to contrast characteristics with respect to the external object using the first image and the second image, and determine a first movement direction and a movement amount of the at least some of the lenses using the first image, the second image, and a designated point spread function based on the conditions satisfying a designated first condition and adjust the focus on the external object by moving the at least some of the lenses in accordance with the determined first movement direction and the determined movement amount. According to an embodiment, the processor may determine a second movement direction of the at least some of the lenses using a contrast difference between the external object included in the first image and the external object included in the second image based on the conditions satisfying a designated second condition, and adjust the focus on the external object at least based on a contrast change of one or more images obtained while moving the at least some of the lenses along the determined second movement direction.

According to various embodiments of the disclosure, a method for controlling a focus of camera lenses in an electronic device may include: obtaining a first image corresponding to a first position of at least some of the lenses and a second image corresponding to a second position of the at least some of the lenses with respect to an external object using a camera including one or more lenses; determining conditions related to contrast characteristics with respect to the external object using the first image and the second image; determining a first movement direction and a movement amount of the at least some of the lenses using the first image, the second image, and a designated point spread function based on the conditions satisfying a designated first condition, and adjusting the focus on the external object by moving the at least some of the lenses in accordance with the determined first movement direction and the determined movement amount; and determining a second movement direction of the at least some of the lenses using a contrast difference between the external object included in the first image and the external object included in the second image based on the conditions satisfying a designated second condition, and adjusting the focus on the external object at least based on a contrast change of one or more images obtained while moving the at least some of the lenses along the determined second movement direction.

Advantageous Effects of Invention

The electronic device according to various embodiments of the disclosure can quickly focus the photographed image so as to be able to photograph the image of the clear picture quality based on the contrast AF method and the DFD method. According to various embodiments of the disclosure, it is possible to measure reliability of the photographed image based on the DFD method, and it is possible to determine the movement point and the movement direction of the lenses to obtain the image of the clear picture quality based on the measured reliability. According to various embodiments, the electronic device can quickly focus the photographed image by moving the lenses through running in parallel of the DFD method and the contrast AF method corresponding to the determined movement point and the movement direction of the lenses. In addition, various effects being directly or indirectly grasped through the disclosure can be provided.

MODE FOR THE INVENTION

Figure 1:
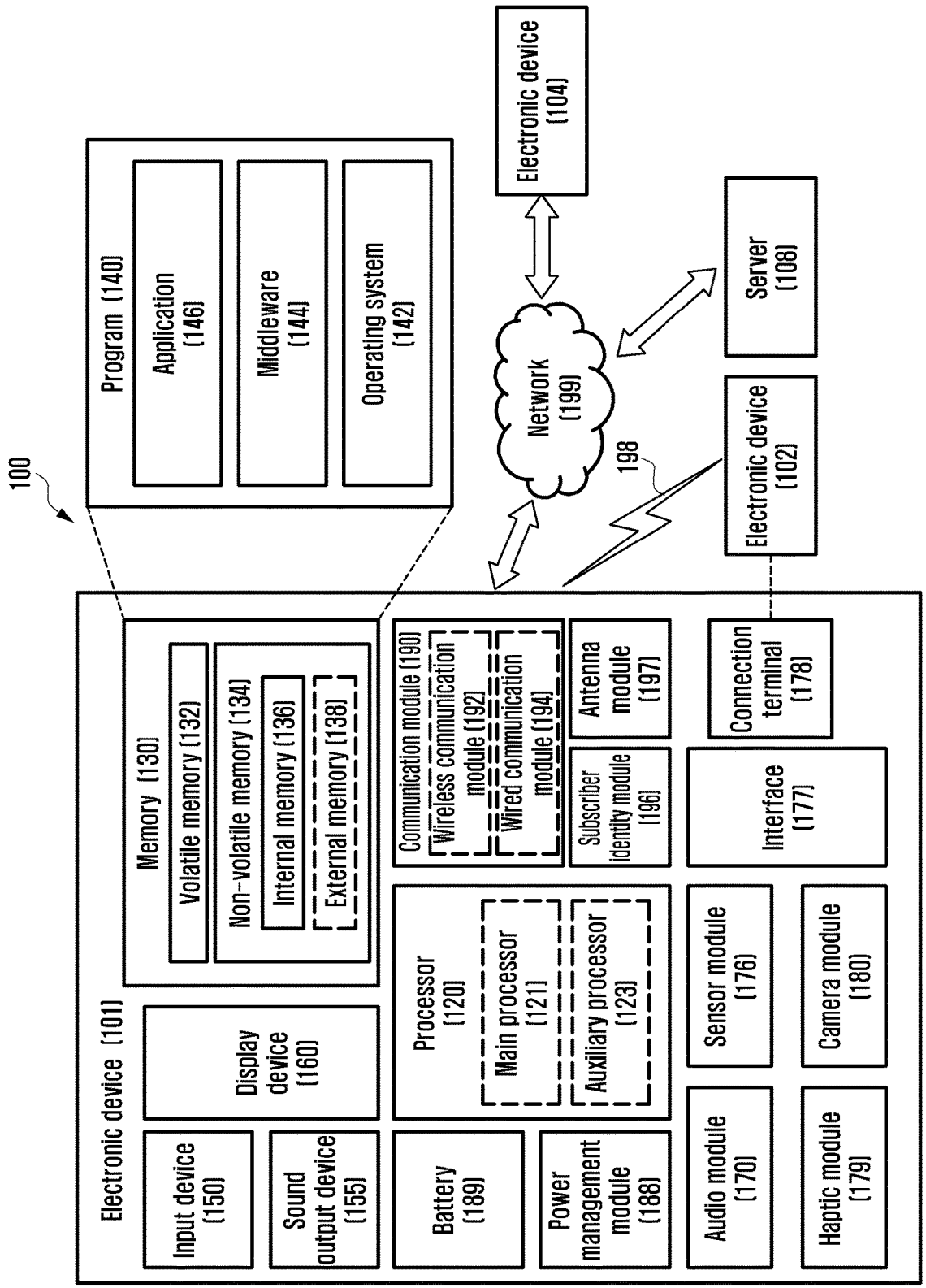
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 (e.g., DRAM, SRAM, or SDRAM) or the non-volatile memory 134.

The program 140 may be stored in the memory 130 as software, and may include, for example, an operating system (OS) 142, middleware 144, or an application 146 (e.g., application program).

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases.

As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
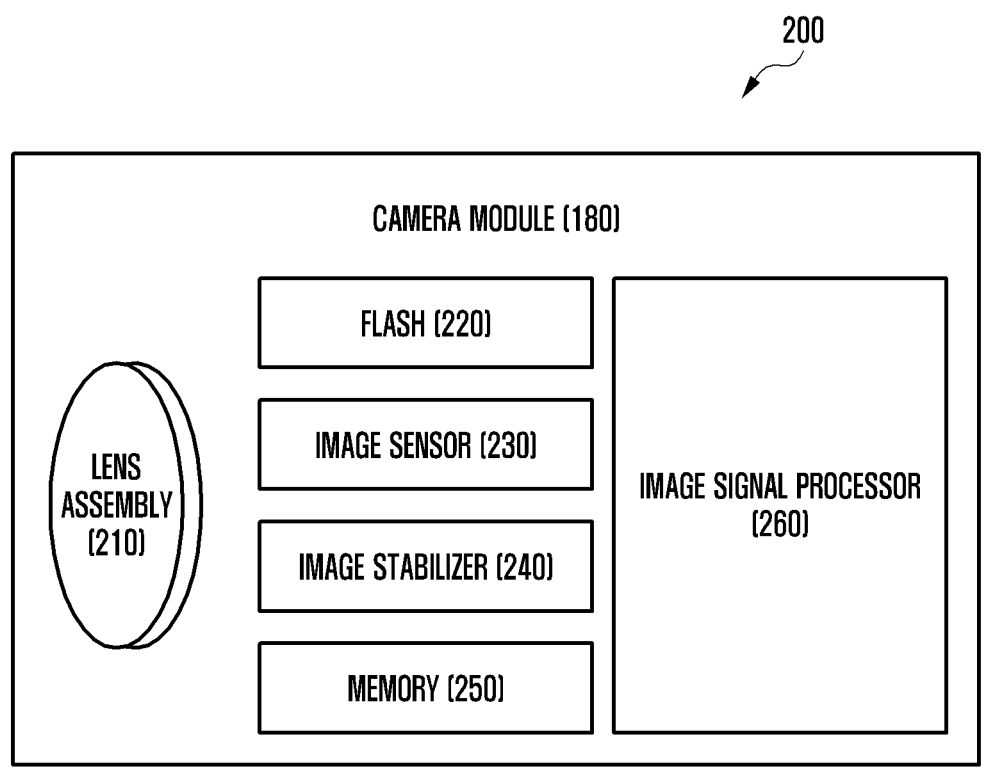
FIG. 2 is a block diagram exemplifying a camera module according to various embodiments.

FIG. 2 is a block diagram 200 illustrating a camera module 180 according to various embodiments. Referring to FIG. 2, the camera module 180 may include a lens assembly 210, a flash 220, an image sensor 230, an image stabilizer 240, a memory 250 (e.g., buffer memory), or an image signal processor 260.

The lens assembly 210 may collect light emitted from a subject that is a target of image photographing. The lens assembly 210 may include one or more lenses. According to an embodiment, the camera module 180 may include a plurality of lens assemblies 210. In this case, the camera module 180 may form, for example, a dual camera, 360-degree camera, or a spherical camera. Some of the plurality of lens assemblies 210 may have the same lens attributes (e.g., viewing angle, focal length, autofocus, f-number, or optical zoom), or at least one of the lens assemblies may have one or more lens attributes that are different from the lens attributes of other lens assemblies. The lens assembly 210 may include, for example, a wide-angle lens or a telephoto lens.

The flash 220 may emit the light used to reinforce the light being emitted or reflected from the subject. According to an embodiment, the flash 220 may include one or more light-emitting diodes (e.g., red-green-blue (RGB) LED, white LED, infrared LED, or ultraviolet LED) or a xenon lamp.

The image sensor 230 may obtain an image corresponding to the subject by converting the light emitted or reflected from the subject and transferred through the lens assembly 210 into an electrical signal. According to an embodiment, the image sensor 230 may include, for example, one image sensor selected from image sensors having different attributes, such as RGB sensor, black and white (BW) sensor, IR sensor, or UV sensor, a plurality of image sensors having the same attribute, or a plurality of image sensors having different attributes. The respective image sensors included in the image sensor 230 may be implemented using, for example, charge coupled device (CCD) sensor or complementary metal oxide semiconductor (CMOS) sensor.

The image stabilizer 240 may move at least one lens or the image sensor 230 included in the lens assembly 210 in a specific direction or may control the operation characteristics (e.g., read-out timing) of the image sensor 230 in response to movement of the camera module 180 or the electronic device 101 including the camera module 180. This may compensate for at least a part of negative effects caused by the movement against the image being photographed. According to an embodiment, the image stabilizer 240 may sense such movement of the camera module 180 or the electronic device 101 using a gyro sensor (not illustrated) or an acceleration sensor (not illustrated) disposed inside or outside the camera module 180. According to an embodiment, the image stabilizer 240 may be implemented by, for example, an optical image stabilizer.

The memory 250 may store at least a part of the image obtained through the image sensor 230 at least temporarily for the next image processing work. For example, if the image obtaining according to a shutter is delayed or if a plurality of images are obtained at a high speed, the obtained original image (e.g., Bayer-patterned image or high-resolution image) may be stored in the memory 250, and a corresponding copy image (e.g., low-resolution image) may be previewed through a display device 160. Thereafter, if a designated condition is satisfied (e.g., user input or system command), at least a part of the original image stored in the memory 250 may be obtained and processed by, for example, the image signal processor 260. According to an embodiment, the memory 250 may be configured as at least a part of the memory 130 or as a separate memory being operated independently of the memory 130.

The image signal processor 260 may perform one or more image processes with respect to the image obtained through the image sensor 230 or the image stored in the memory 250. The one or more image processes may include, for example, depth map generation, 3D modeling, panorama generation, feature point extraction, image synthesis, and image compensation (e.g., noise reduction, resolution control, brightness control, blurring, sharpening, or softening). Additionally or alternatively, the image signal processor 260 may perform a control (e.g., exposure time control or read-out timing control) with respect to at least one (e.g., image sensor 230) of constituent elements included in the camera module 180. The image processed by the image signal processor 260 may be re-stored in the memory 250 for an additional process, or may be provided to an external constituent element (e.g., memory 130, display device 160, electronic device 102, electronic device 104, or server 108) of the camera module 180. According to an embodiment, the image signal processor 260 may be configured as at least a part of the processor 120 or as a separate processor being operated independently of the processor 120. In case that the image signal processor 260 is configured as a separate processor from the processor 120, the at least one image processed by the image signal processor 260 may be display through the display device 160 after being processed as it is or being additionally processed by the processor 120.

According to an embodiment, the electronic device 101 may include a plurality of camera modules 180 having different attributes or functions, respectively. In this case, for example, at least one of the plurality of camera modules 180 may be a wide-angle camera, and at least another of the plurality of camera modules 180 may be a telephoto camera. Similarly, at least one of the plurality of camera modules 180 may be a front camera, and at least another of the plurality of camera modules 180 may be a rear camera.

Figure 3A:
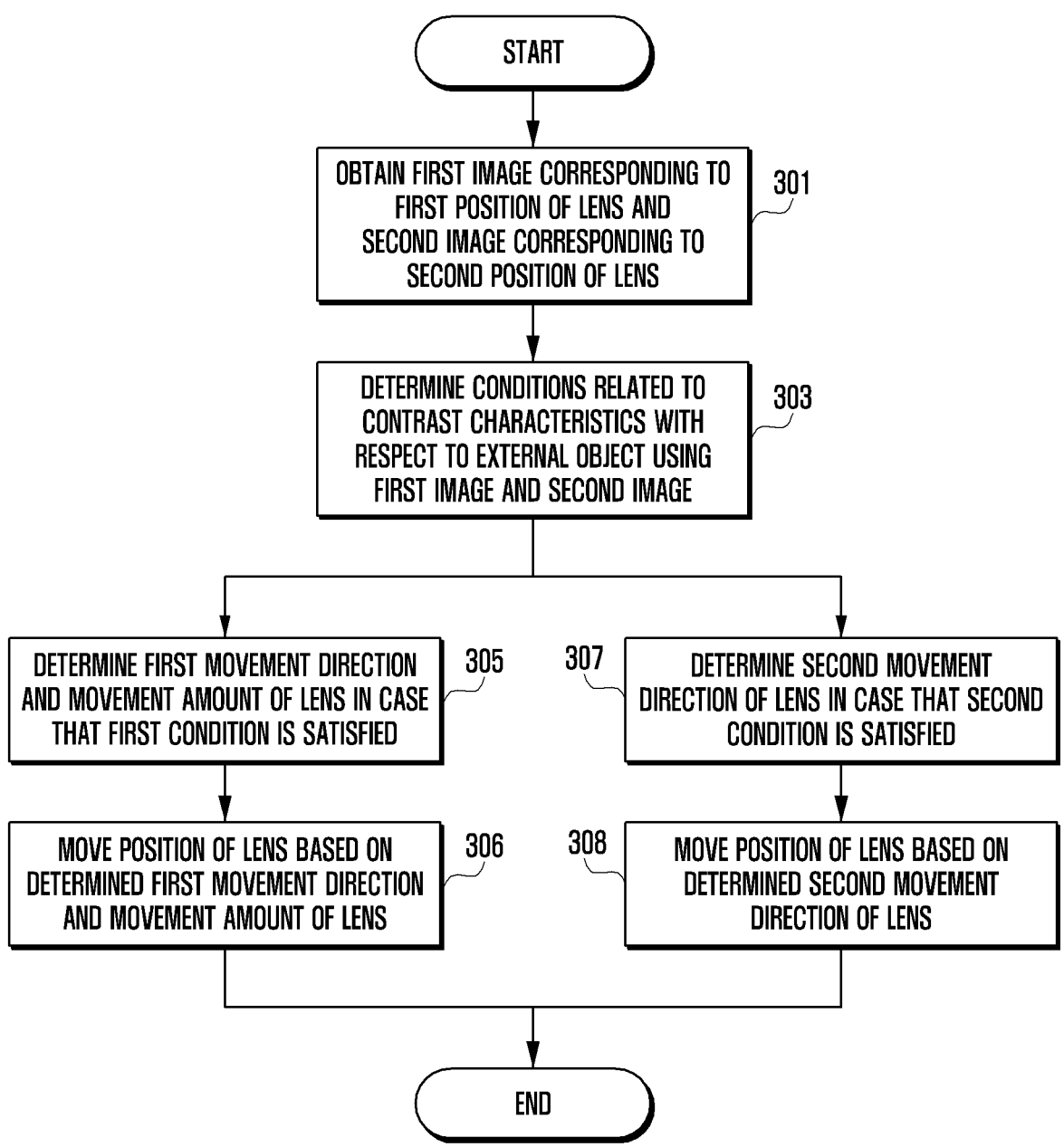
FIGS. 3A to 3C are flowcharts illustrating an autofocus (AF) method according to various embodiments.
Figure 3B:
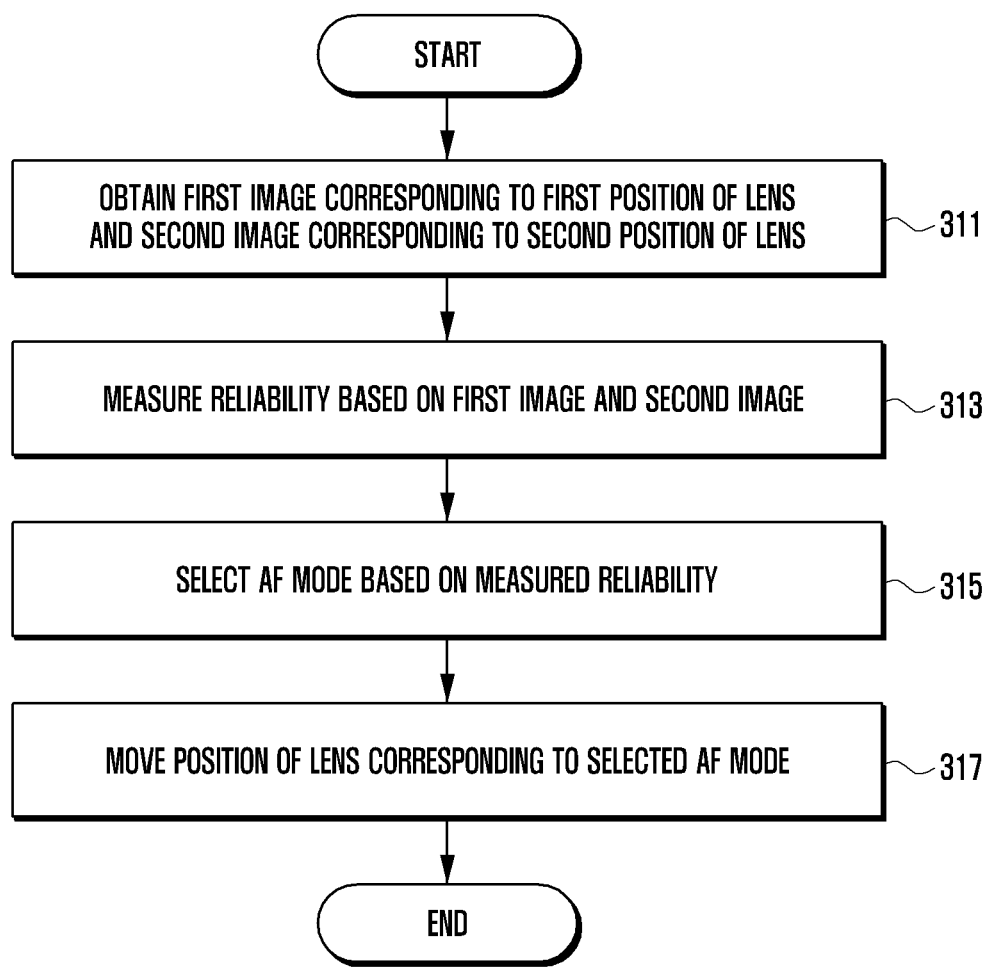
Figure 3C:
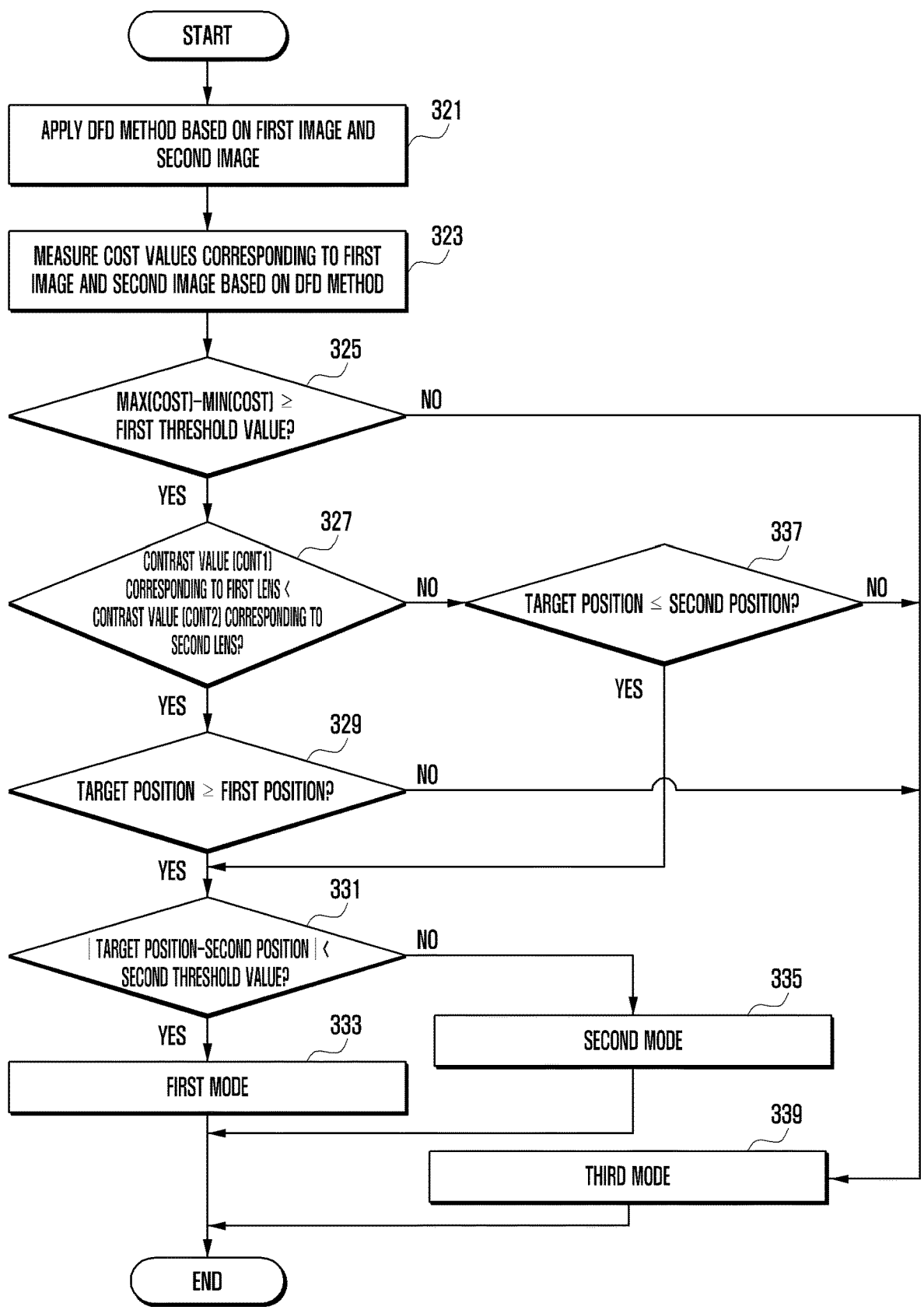

FIGS. 3A to 3C are flowcharts illustrating an autofocus (AF) method according to various embodiments. FIG. 3A is a flowchart in which a condition related to the contrast characteristics with respect to an external object is determined using a first image corresponding to a first position of a lens and a second image corresponding to a second position of the lens, and the position of the lens is moved corresponding to the condition. FIG. 3B is a flowchart in which reliability is measured based on a plurality of images (e.g., first image and second image) corresponding to the first position and the second position of lenses, and the positions of the plurality of lenses are moved based on the measured reliability. FIG. 3C is a flowchart in which a DFD method is applied based on the plurality of images, and an AF mode is selected to adjust the positions of the plurality of lenses based on the cost value measured by the DFD method.

Referring to FIG. 3A, at operation 301, at operation 301, a processor (e.g., processor 120 of FIG. 1) of an electronic device (e.g., electronic device 101 of FIG. 1) may obtain the first image and the second image using a camera module (e.g., camera module 180 of FIG. 1). For example, the camera module 180 may include a lens assembly (e.g., lens assembly 210 of FIG. 2) including one or more lenses and an image signal processor (e.g., driving unit, image signal processor 260 of FIG. 2) capable of adjusting the focus by moving at least some of the lenses of the lens assembly 210. According to an embodiment, the at least some of the lenses may include at least one lens, and may include one lens or a plurality of lenses. The at least some of the lenses may include lens groups. The processor 120 may obtain a first image corresponding to a first position of the at least some of the lenses and a second image corresponding to a second position of the at least some of the lenses using the camera module 180. According to an embodiment, the first image and the second image may be photographed images with respect to an external object.

At operation 303, the processor 120 may determine conditions related to contrast characteristics with respect to the external object using the first image and the second image. For example, the processor 120 may obtain defocus information corresponding to at least one of the first image and the second image, and may determine the conditions (e.g., first condition, second condition, and third condition) related to the contrast characteristics based on the obtained defocus information.

At operation 305, if the first condition is satisfied, the processor 120 may determine a first movement direction and a movement amount of the lens. According to an embodiment, the first condition may be a condition having a high reliability with respect to a target position that is determined to accurately focus on the external object. According to an embodiment, the processor 120 may determine the first movement direction and the movement amount of the lens corresponding to the target position.

At operation 306, the processor 120 may move the position of the lens based on the determined first movement direction and the movement amount. For example, the processor 120 may move the lens in accordance with the movement direction and the movement amount corresponding to the target position.

At operation 307, if the second condition is satisfied, the processor 120 may determine a second movement direction of the lens. According to an embodiment, the second condition may be a condition having a low reliability with respect to the target position that is determined to accurately focus on the external object. The second condition may be a condition on which the movement direction corresponding to the target position may be reliable, but it may be difficult to trust the movement amount. According to an embodiment, the processor 120 may determine a second movement direction of the lens corresponding to the target position.

At operation 308, the processor 120 may move the position of the lens based on the determined second movement direction. For example, the processor 120 may move the lens in accordance with the movement direction corresponding to the target position.

Referring to FIG. 3B, at operation 311, the processor (e.g., processor 120 of FIG. 1) of the electronic device (e.g., electronic device 101 of FIG. 1) may obtain the first image and the second image using the camera module (camera module 180 of FIG. 1). For example, the processor 120 may obtain the first image corresponding to the first position of the at least some of the lenses included in the camera module 180 and the second image corresponding to the second position of the at least some of the lenses. According to an embodiment, the image signal processor (image signal processor 260 of FIG. 2) included in the camera module 180 may obtain the first image and the second image based on the positions (e.g., first position and second position) of the at least some of the lenses included in the lens assembly (lens assembly 210 of FIG. 2). For example, the image signal processor 260 may obtain the first image captured by the at least some of the lenses positioned in the first position and the second image captured by the at least some of the lenses positioned in the second position. For example, the lens assembly 210 may collect light emitted (reflected) from the external object (e.g., subject), and may obtain the first image corresponding to the first position of the lens and the second image corresponding to the second position of the lens.

At operation 313, the processor 120 may measure the reliability (hereinafter, the reliability means a reliability value) based on the first image and the second image. According to an embodiment, the image signal processor 260 may apply a depth from defocus (DFD) method and may measure a DFD resultant value based on the first image and the second image obtained through the lens assembly 210. For example, the DFD method may obtain defocus information on the first image corresponding to the first position and the second image corresponding to the second position based on the positions first position and second position) of the lenses. The DFD method may determine the position (e.g., target position) of the lens corresponding to the onfocus state (e.g., focusing state on the subject) based on the obtained defocus information. The DFD method may search for and determine the target position and the movement direction of the lens corresponding to the target position using predefined point spread function (PST) information. For example, the PSF information may be predefined to apply the DFD method, or may be stored in the memory (e.g., memory 130 of FIG. 1) of the electronic device 101. For example, the target position may be the position of the lens corresponding to the onfocus, or may be the position of the at least one lens which should be moved to photograph an image of a clear picture quality. According to an embodiment, the PSF information may be pre-stored in the memory 130, and if the defocus information corresponding to the first image and the second image is obtained, the electronic device 101 may measure the cost value based on the PSF information and the defocus information. For example, the processor 120 may measure the PSF information corresponding to the first image and the second image based on a separated distance between the first position and the second position. According to an embodiment, the processor 120 may measure the cost value corresponding to the first image and the second image based on the PSF information stored in the memory 130. According to an embodiment, the processor 120 may measure the reliability on the target position.

According to an embodiment, the processor 120 may measure the reliability on the target position by applying the DFD method. For example, high reliability may mean that the target position can be accurately predicted, whereas low reliability may mean that it is difficult to accurately predict the target position. According to an embodiment, in case of the high reliability, the processor 120 can determine the movement direction and the movement amount of the lens corresponding to the target position, whereas in case of the low reliability, the processor 120 can determine only the movement direction of the lens corresponding to the target position.

At operation 315, the processor 120 may select the AF mode based on the measured reliability. According to an embodiment, the AF mode may include a first mode, a second mode, and a third mode. The first mode may be the AF' mode in which the accuracy on the target position is high, the position of at least one lens is moved to the target position, and the photographed image is focused by applying a contrast AF method. The second mode may be the AF mode in which the target position is reliable, but the accuracy on the target position is relatively lower than that in the first mode. The second mode may be the AF mode in which the photographed image is focused by applying the contrast AF method while the position of at least one lens is moved in the direction of the target position. The third mode may be the AF mode in which the accuracy on the target position is low to the extent that it is difficult to trust the target position. The third mode may be the AF mode in which the photographed image is focused by applying the contrast AF method at the current position of the lens. According to an embodiment, the processor 120 may select one of the plurality of AF modes based on the measured reliability.

At operation 317, the processor 120 may move the position of the lens corresponding to the selected AF mode. For example, if the first mode is selected, the processor 120 may primarily move the lens corresponding to the target position, and may secondarily move the lens in order to accurately adjust the focus on the external object. According to an embodiment, the processor 120 may move the position of the at least some of the lenses corresponding to the target position, and may adjust the focus of the photographed image by applying the contrast AF method. For example, if the second mode is selected, the processor 120 may determine the movement direction of the lenses corresponding to the target position, and may adjust the position of the lenses based on the determined movement direction. According to an embodiment, the processor 120 may adjust the focus of the photographed image by applying the contrast AF method while moving the lenses based on the determined movement direction. For example, if the third mode is selected, the processor 120 may adjust the focus of the photographed image by applying the contrast AF method at the current position of the lenses.

According to an embodiment, the electronic device 101 may measure the reliability of the target position according to the DFD method, and may select the AF mode based on the measured reliability. According to an embodiment, the electronic device 101 may apply the contrast AF method corresponding to the selected AF mode. According to an embodiment, the electronic device 101 may focus the photographed image more quickly by mixedly applying the DFD method and the contrast AF method.

According to an embodiment, the electronic device 101 may include a first focus controller for applying the DFD method and a second focus controller for applying the contrast AF method. According to an embodiment, the first focus controller may determine the target position and the movement direction of the lenses corresponding to the target position based on the DFD method. According to an embodiment, the second focus controller may adjust the focus so that the photographed image is clearly displayed by moving the position of the lenses based on the contrast AF' method.

FIG. 3C may be a flowchart illustrating in detail a process being performed corresponding to operations 313 to 3115 of FIG. 3B. FIG. 3C is a flowchart in which the DFD method is applied based on the plurality of images corresponding to the first position and the second position of the lenses, and the AF mode for adjusting the positions of the plurality of lenses is selected based on the cost value measured by the DFD method.

Referring to FIG. 3C, according to an embodiment, the processor 120, at operation 321, may apply the DFD method based on the first image and the second image. The processor 120 may measure the DFD resultant value according to the DID Method.

According to an embodiment, at operation 323, the processor 1120 may measure the cost value corresponding to the first image and the second image based on the DFD method. The DFD method may search for and determine the target position and the movement direction of the lens corresponding to the target position using the predefined PSF information. For example, the PSI' information may be predefined to apply the DFD method, and may be stored in the memory 130. The target position may be the position of the lens corresponding to the on-focus, or may be the position of the at least one lens which should be moved in order to photograph the image of the clear picture quality. According to an embodiment, the processor 120 may measure the cost value based on the DFD resultant value corresponding to the first image and the second image and the PSF information stored in the memory 130, The processor 120 may measure at least one cost value corresponding to the PSF information, and may determine the maximum value (e.g., Max(cost)) of the measured cost value and the minimum value (e.g., Min(cost)) of the measured cost value.

According to an embodiment, at operation 325, the processor 120 may identify whether a difference value between the maximum value of the cost value and the minimum value of the cost value is equal to or larger than a first threshold value. According to an embodiment, the difference value between the maximum value and the minimum value of the cost value may mean the difference between the defocus values corresponding to the first image and the second image. For example, the small difference value may mean that the difference between the defocus values is small and it is difficult to apply the DFD method. According to an embodiment, the first threshold value may be predetermined by a developer, and in case that the difference value between the maximum value and the minimum value of the cost value is equal to or larger than the first threshold value, the processor 120 may determine the target position in accordance with the DFD method. According to an embodiment, at operation 325, if the difference value between the maximum value and the minimum value of the cost value is equal to or larger than the first threshold value, the processor 120 may proceed with operation 327, whereas if the difference value between the maximum value and the minimum value of the cost value is smaller than the first threshold value, the processor 120 may proceed with operation 339.

According to an embodiment, at operation 327, the processor 120 may compare a contrast value con1 corresponding to the first position of the at least some of the lenses with a contrast value con2 corresponding to the second position of the at least some of the lenses. According to an embodiment, con1 may mean the contrast value at the first position, and con2 may mean the contrast value at the second position. According to an embodiment, the first position and the second position may not be the same, and the at least one lens may be positioned in a direction relatively closer to the focus position of the external object (e.g., subject). For example, a case that con2 is larger than con1 may mean that the second position is positioned in the direction relatively closer to the focus position of the external object than the first position, According to an embodiment, if con2 is larger than con1 at operation 327, the processor 120 may proceed with operation 329, whereas if con2 is not larger than con1 at operation 327, the processor 120 may proceed with operation 337, According to an embodiment, the lens may move from a Far End position to a Near End position, and on the assumption that the Far End position is 0, the Near End position may be in a positive (+) direction. According to an embodiment, the processor 120 may identify the first position and the second position of the lens based on the contrast values con1 and con2.

According to an embodiment, at operation 329, the processor 120 may compare the target position in accordance with the DFD method with the first position. For example, at operation 327, the processor 120 may compare the contrast values at the first and second positions with each other, and may identify that the first position is relatively far apart from the focus position of the external object as compared with the second position (e.g., first position con1<second position con2). At operation 329, if the target position is relatively closer to the focus position of the external object than the first position (e.g., target position >first position), the processor 120 may proceed with operation 331, whereas if the target position is relatively farther from the focus position of the external object than the first position (e.g., target position <first position), the processor 120 may proceed with operation 339. For example, a case that the target position is farther from the focus position of the external object than the first position may mean that the target position is closer to the Far End position of the lens than the first position in a state of first position con1<second position con2 (e.g., target position <first position con1). For example, the case that the target position is farther from the focus position of the external object than the first position may mean that the target position (e.g., DM resultant value in accordance with the DFD method) has a smaller contrast value than that of the first position con1. According to an embodiment, if the target position is determined so that the contrast value of the target position is smaller than the contrast value of the first position con1, the processor 120 may proceed with operation 331 from operation 329.

According to various embodiments, the second position corresponding to the at least some of the lenses may be relatively farther from the focus position of the external object than the first position (e.g., second position <first position). According to an embodiment, at operation 337, the processor 120 may compare the target position in accordance with the DFD method with the second position. For example, at operation 327, the processor 120 may compare the contrast values at the first position con1 and the second position con2 with each other, and may identify that the second position con2 is relatively farther from the focus position of the external object than the first position con1 (e.g., second position con2<first position con1). At operation 337, if the target position is relatively closer to the focus position of the external object than the second position (e.g., target position <second position), the processor 120 may proceed with operation 331, whereas if the target position is relatively farther from the focus position of the external object than the second position (e.g., target position >second position), the processor 120 may proceed with operation 339.

According to an embodiment, at operation 331, the processor 120 may compare a separated distance between the target position and the second position with a second threshold value. According to an embodiment, the second threshold value may be determined by a developer, and may be a reference value for measuring the accuracy on the target position. For example, if the separated distance between the target position and the second position is equal to or smaller than the second threshold value, it may mean that the accuracy on the target position is high, and the processor 120 may determine the movement direction and the movement amount of the lenses corresponding to the target position, and may adjust the position of the at least some of the lenses corresponding to the determined moving direction and movement amount. For example, if the separated distance between the target position and the second position exceeds the second threshold value, it may mean that the accuracy on the target position is relatively low, and the processor 120 may determine the movement direction of the lenses corresponding to the target position, and may adjust the position of the at least some of the lenses corresponding to the determined movement direction. According to an embodiment, if the separated distance between the target position and the second lens is equal to or smaller than the second threshold value, the processor 120 may proceed with operation 333, whereas if the separated distance between the target position and the second lens exceeds the second threshold value, the processor 120 may proceed with operation 335.

According to an embodiment, at operation 333, the processor 120 may perform the first mode of the AF modes. The first mode may be the AF mode in which the position of the at least some of the lenses is moved and the focus of the photographed image is adjusted by applying the contrast AF method. For example, the first mode may be the AF mode in which the accuracy on the target position is determined to be high, the at least some of the lenses move to the target position, and the contrast AF method is applied.

According to an embodiment, at operation 335, the processor 120 may perform the second mode of the AF modes. The second mode may be the AF mode in which the focus of the photographed image is adjusted by applying the contrast AF method while the at least some of the lenses move. For example, the second mode may be a mode in which the movement direction corresponding to the target position is reliable, but the accuracy on the target position is determined to be relatively lower than that in the first mode. According to an embodiment, the processor 120 may apply the contrast AF method while moving the at least some of the lenses corresponding to the movement direction of the target position.

According to an embodiment, at operation 337, the processor 120 may perform the third mode of the AF modes. The third mode may be the AF mode in which the focus of the photographed image is adjusted by applying the contrast AF method at the current position of the lenses. For example, the third mode may be the mode in which the accuracy on the target position is considerably low to the extent that it is difficult to trust the target position. According to an embodiment, the processor 120 may apply the contrast AF method based on the current position of the lenses.

Figure 4A:
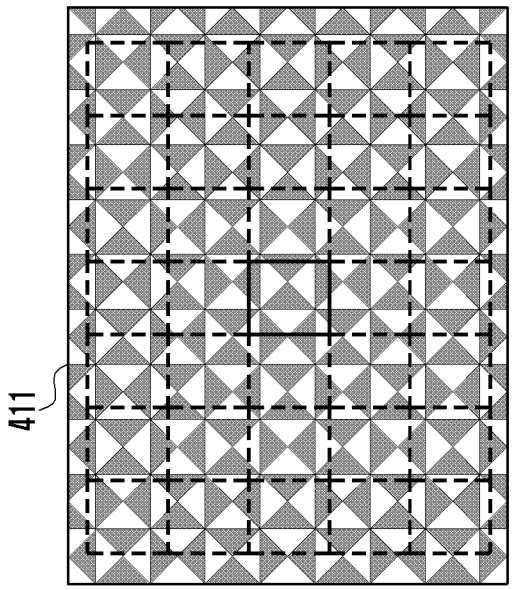
FIGS. 4A and 4B are graphs illustrating DFD resultant values by a DFD method according to various embodiments.
Figure 4A:
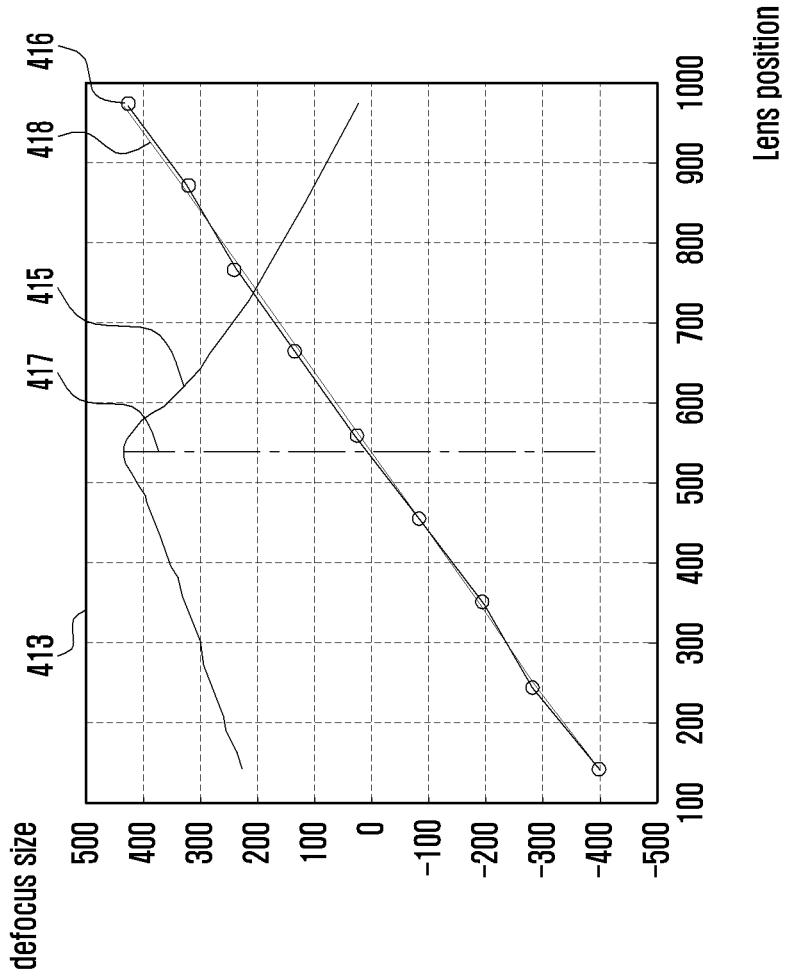
Figure 4B:
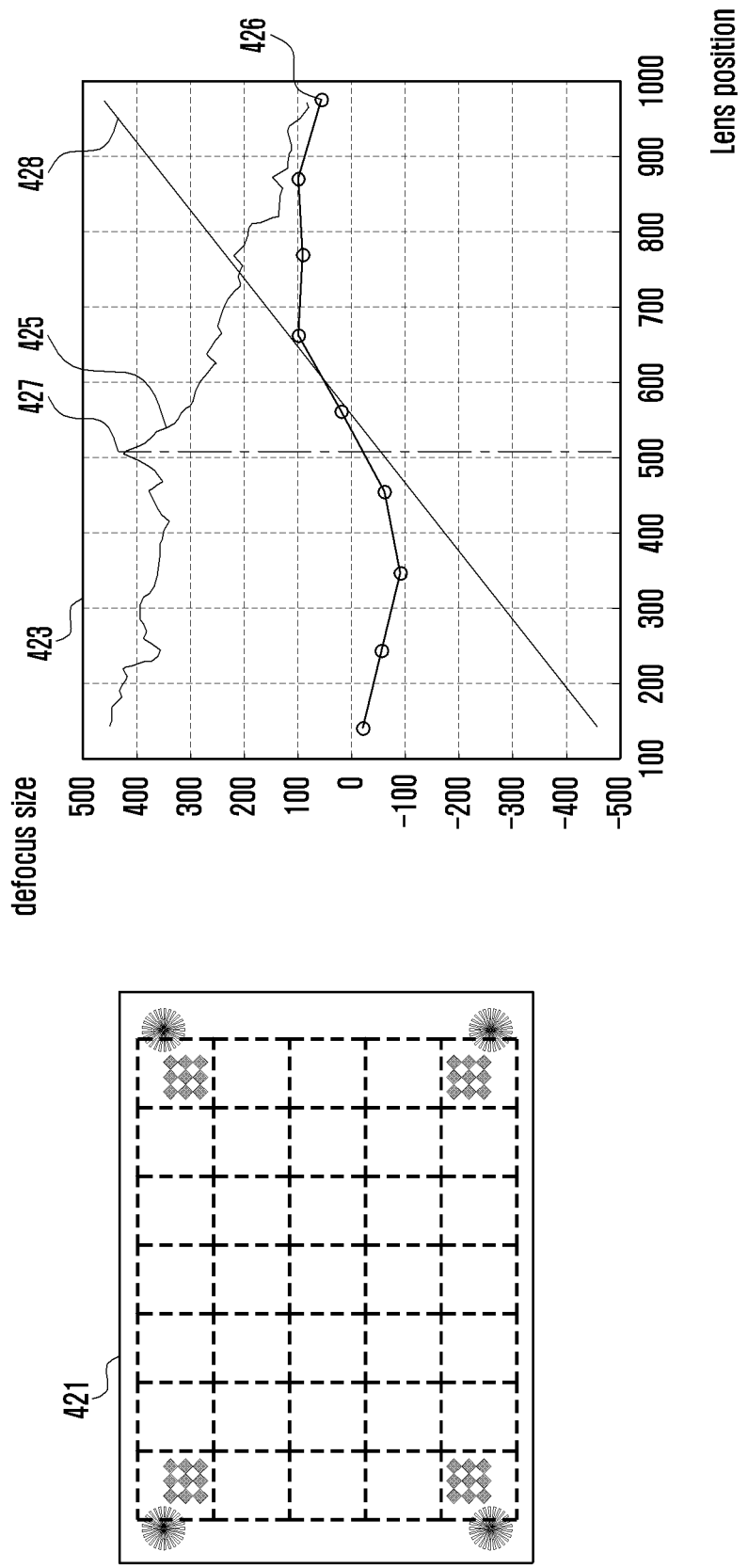

FIGS. 4A and 4B are graphs illustrating DFD resultant values by a DFD method according to various embodiments.

FIGS. 4A and 4B are graphs illustrating DFD resultant values corresponding to a photographed image based on the DFD method.

Referring to FIG. 4A, according to an embodiment, the electronic device (e.g., electronic device 101 of FIG. 1) may perform an autofocus (AF) function with respect to a first photographed image using the camera (e.g., camera module 180 of FIG. 1). FIG. 4A may show a situation where a defocus difference in accordance with the lens movement is properly incurred as a whole. For example, the situation where the defocus difference is properly incurred may be a situation where a blur phenomenon occurs with respect to the external object. FIG. 4A includes a first graph 413 illustrating DFD resultant values corresponding to the first photographed image 411 in case of performing the AF function of the DFD method with respect to the first photographed image 411.

According to an embodiment, the DFD method may be a method in which the target position (e.g., movement point of the lenses on which the subject is on-focused) is predicted by analyzing two sheets of images (e.g., first image and second image) obtained using the at least some of the lenses. According to the DFD method, the reliability on the target position may be heightened only in case that a predetermined amount of defocus difference (e.g., blur difference) exists between the obtained two sheets of images. For example, the electronic device 101 may obtain the first image corresponding to the first position of the lenses included in the camera module 180, and may obtain the second image corresponding to the second position of the lenses. According to an embodiment, the electronic device 101 may calculate the DFD resultant value corresponding to the first photographed image 411 based on the first image and the second image. The first graph 413 illustrated in FIG. 4A may be a graph implemented based on the calculated DFD resultant value. According to an embodiment, the first graph 413 may include a first line graph 415 illustrating the contrast value corresponding to at least one position of the lenses and a second line graph 416 illustrating the DFD resultant value corresponding to the at least one position of the lenses. The first graph 413 may include a contrast peak 417 corresponding to the target position and a third line graph 418 corresponding to an ideal DFD resultant value. For example, the third line graph 418 may be a graph illustrated based on an ideal numerical value of the contrast value. According to an embodiment, in the first graph 413, the second line graph 416 may be similarly illustrated corresponding to the third line graph 418. According to an embodiment, the first photographed image 411 may be an ideal image to apply the DFD method.

Referring to FIG. 4B, according to an embodiment, the electronic device 101 may perform the autofocus (AF) function with respect to the second photographed image 421 using the camera. FIG. 4B may show a situation where there is almost no difference value of the contrast value as a whole, and almost no defocus difference is incurred in accordance with the movement of the lens. FIG. 4B includes the second graph 423 in which the DFD resultant value corresponding to the second photographed image 421 is illustrated when the AF function in the DFD method is performed with respect to the second photographed image 421. According to an embodiment, the second graph may include a first line graph 425 illustrating the contrast value corresponding to at least one position of the lenses and a second line graph 426 illustrating the DFD resultant value corresponding to the at least one position of the lenses. The second graph 423 may include a contrast peak 427 corresponding to the target position and a third line graph 428 corresponding to an ideal DFD resultant value. According to an embodiment, in the second graph 423, the second line graph 426 may not correspond to the third line graph 428, and the second photographed image 421 may not be appropriate to apply the DFD method.

According to an embodiment, the second photographed image 421 may be the subject in which a predetermined amount of defocus does not exist between the two sheets of images (e.g., first image and second image). According to an embodiment, the DFD resultant value corresponding to the second photographed image 421 may be calculated. The second graph 423 illustrated in FIG. 4B may be a graph implemented based on the calculated DFD resultant value.

Figure 5A:
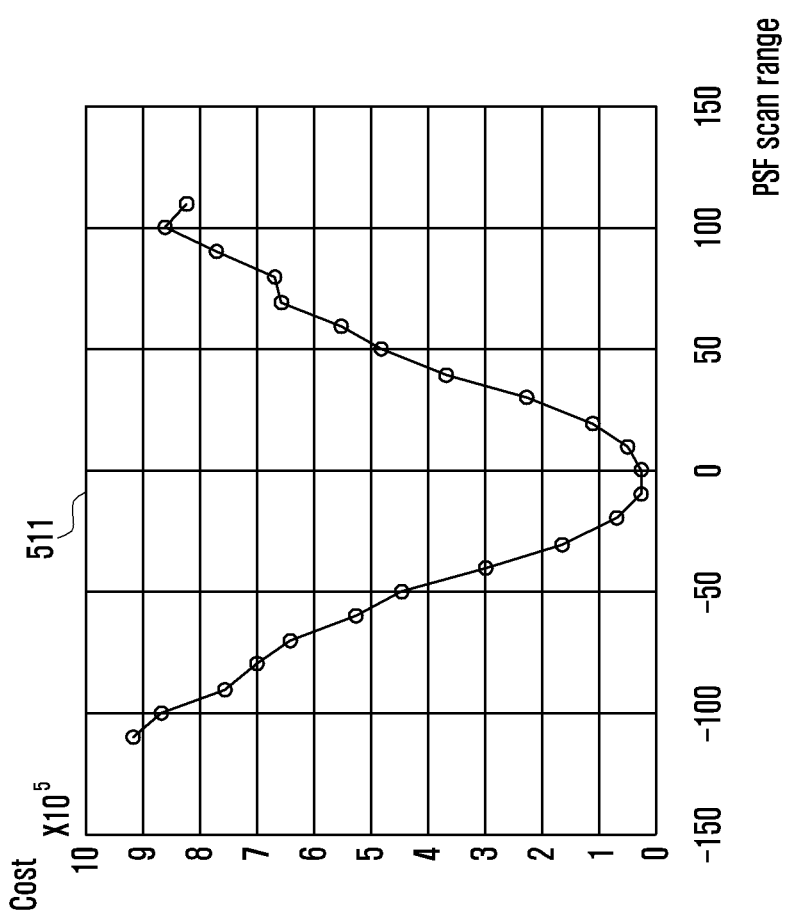
FIGS. 5A to 5C are graphs illustrating cost values measured based on DFD resultant values according to various embodiments.
Figure 5A:
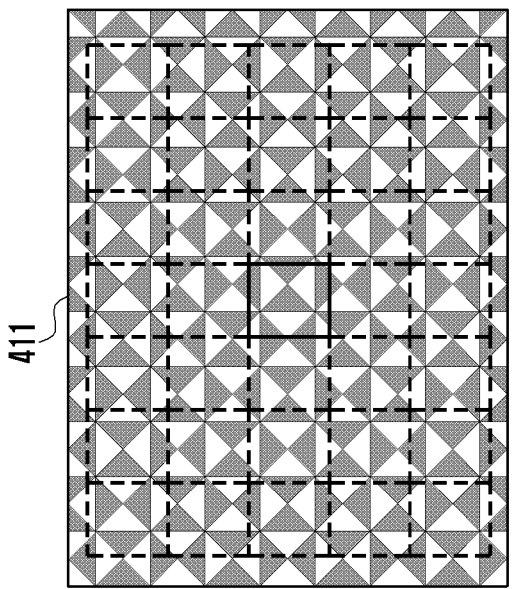
Figure 5B:
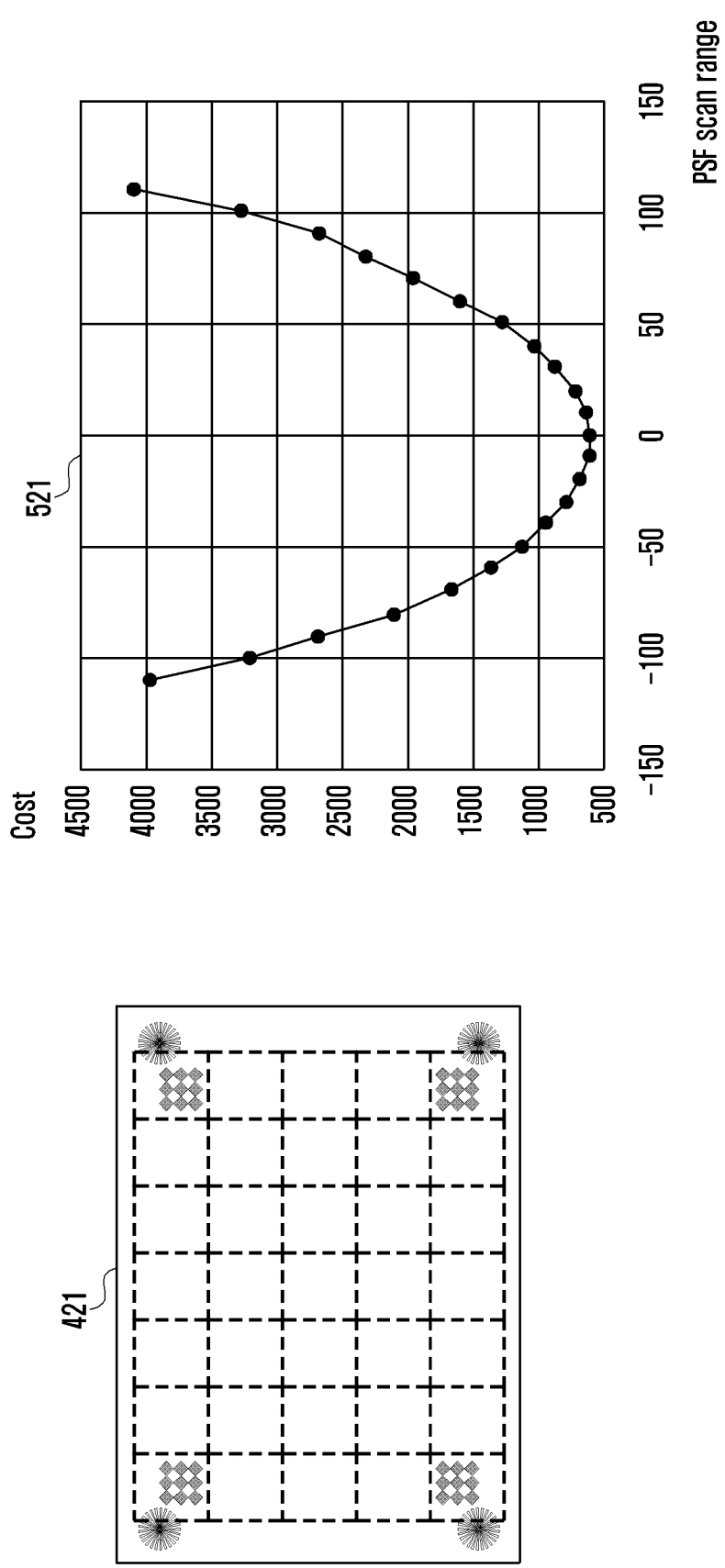
Figure 5C:
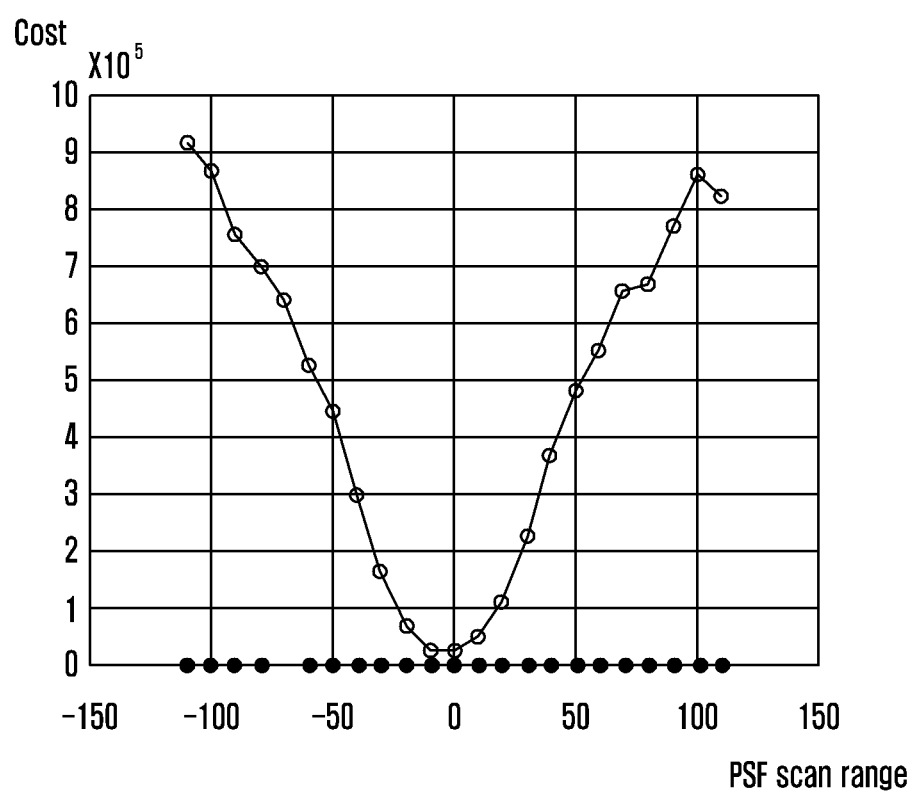

FIGS. 5A to 5C are graphs illustrating cost values measured based on DFD resultant values according to various embodiments.

FIG. 5A illustrates a first cost graph 511 implemented based on a cost value that is calculated based on the DFD resultant value corresponding to the first photographed image 411.

According to an embodiment, a formula for calculating a cost value based on a DFD resultant value may be as Equation 1 below.

$$\text{Cost}(d) = \frac{|F_2 K(d) - F_1 K(d+\delta)|^2}{|K(d)|^2 + |K(d+\delta)|^2}$$

$$= \frac{|(F_1 + \Delta F) K(d) - F_1 (K(d) + \Delta K)|^2}{|K(d)|^2 + |K(d) + \Delta K|^2}$$

Equation 1

In Equation 1, d and δ values may be predefined defocus values, F1 may be a discrete cosine transform (DCT) value corresponding to the first image, and F2 may be a DCT value corresponding to the second image. For example, d may be a defocus numerical value defined based on a perfectly ideally on-focused target position when a point spread function (PSF) value is set. The δ value may be a numerical value corresponding to the separated distance between the first image and the second image. K may be a predefined point spread function (PSF) value. ΔF may be a defocus difference value between the first image and the second image, and ΔK may be a change of a PSF value.

By organizing the numerator formula in the above Equation 1, the following Equation 2 may be given.

$$(\text{Numerator}) = |\Delta F K(d) - F_1 \Delta K|^2$$

Equation 2

Referring to the above Equation 2, ΔK may be a defocus difference value based on a predefined PSF value, and may be a fixed value. If the defocus value is small as a whole, $F_1$ value and ΔF value become smaller, and the level difference between the cost values may become smaller. That is, the maximum value (e.g., Max(cost)) of the cost value and the minimum value (e.g., Min(cost)) of the cost value may become smaller as a whole, and the difference value between the maximum value and the minimum value (e.g., level difference between cost values) may become smaller. A formula to measure a reliability value corresponding to a photographed image may be the same as Equation 3 below.

$$\text{Reliability} = \max(\text{Cost}) - \min(\text{Cost})$$

Equation 3

According to various embodiments, as in Equation 3, the reliability value corresponding to the photographed image may be determined based on the difference value between the maximum value of the cost value and the minimum value of the cost value.

Referring to FIG. 5A, the cost value corresponding to the first photographed image 411 may be calculated, and the first cost graph 511 may be implemented based on the cost value.

FIG. 5B illustrates a second cost graph 521 implemented based on the cost value that is calculated based on the DFD resultant value corresponding to the second photographed image 421.

According to an embodiment, the above-described Equations 1 to 3 may be applied based on the DFD resultant value corresponding to the second photographed image 421, and the cost value corresponding to the second photographed image 421 may be calculated. According to an embodiment, the first cost graph 521 may be implemented based on the calculated cost value.

FIG. 5C is a graph in which the first cost graph 511 and the second cost graph 521 are illustrated. Referring to FIG. 5~~, it may be possible to compare the cost values of the first photographed image 411 and the second photographed image 421. For example, in the first photographed image 411, a predetermined amount of defocus (e.g., blur amount) may exist between the first image and the second image, and the level difference between the cost values (e.g., difference value between the maximum value and the minimum value of the cost value) may be large. According to an embodiment, the first photographed image 411 may adjust the position of the lenses by applying the DFD method, and may adjust the position of the lenses based on one AF mode of the first mode and the second mode. For example, the second photographed image 421 may have little defocus amount (e.g., blur amount) between the first image and the second image, and may have a small level difference between the cost values (e.g., difference value between the maximum value and the minimum value of the cost value). According to an embodiment, in the second photographed image 421, it may be difficult to apply the DFD method, and the position of the lenses may be adjusted based on the third mode of the AF modes. Based on FIG. 5C, the level difference between the cost values corresponding to the first photographed image 411 and the second photographed image 421 is appended below.

TABLE 1

| | Level difference between cost values (Max(cost)-Min(cost)) |
|---|---|
| First photographed image 411 | 8.9101e+05 |
| Second photographed image 421 | 3.6154e+03 |

According to an embodiment, the electronic device 101 may apply the DFD method based on the first image and the second image, and if the difference in defocus amount between the first image and the second image is equal to or smaller than a predetermined amount (e.g., first threshold value), it may be difficult to apply the DFD method. A case that it is difficult to apply the DFD method may mean that it is difficult to determine the target position or the movement direction of the lenses corresponding to the target position by applying the DFD method. According to an embodiment, if the difference in defocus amount between the first image and the second image is equal to or smaller than the predetermined amount (e.g., first threshold value), the electronic device 101 may adjust the focus of the photographed image based on the contrast AF method.

Figure 6:
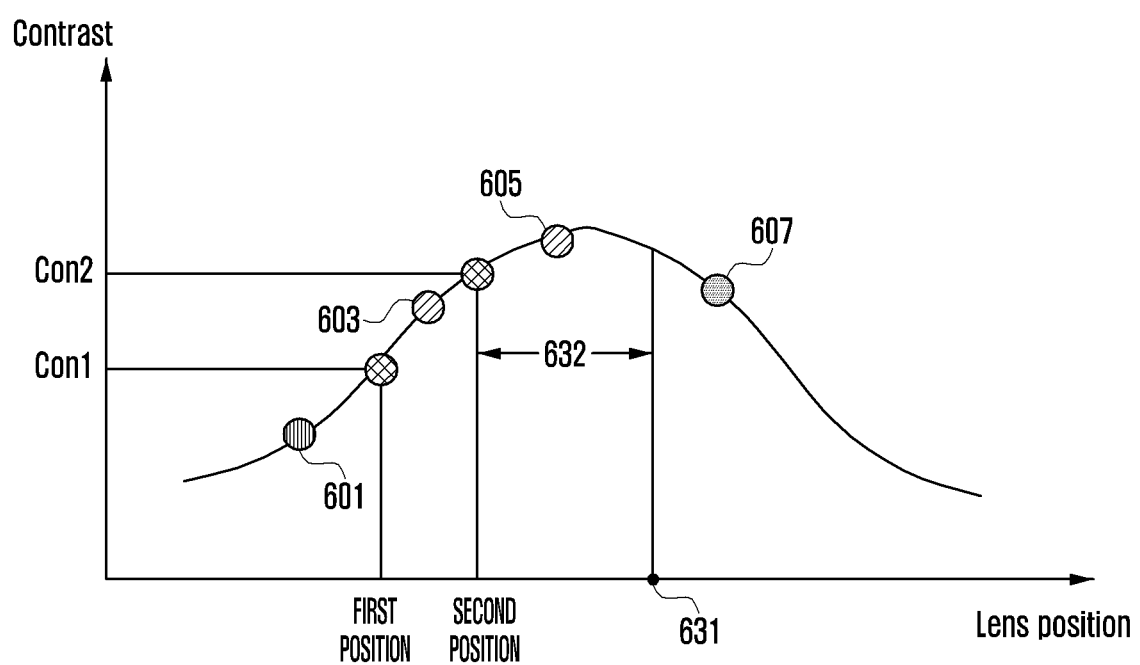
FIG. 6 is a graph illustrating a method for determining an AF mode based on reliability according to various embodiments.

FIG. 6 is a graph illustrating a method for determining an AF mode based on reliability according to various embodiments.

Referring to FIG. 6, a first contrast value Con1 corresponding to the first position of the at least some of the lenses and a second contrast value Con2 corresponding to the second position of the at least some of the lenses are illustrated. According to an embodiment, the contrast value may be determined corresponding to the position of the lenses, and the position of the lenses may be identified based on the contrast value. Referring to FIG. 6, the first position and the second position may be identified. The first position and the second position may be relative positions, and the first position may be positioned to be relatively farther from the focus position of the external object than the second position. According to an embodiment, the first position may be positioned farther from the focus position of the external object than the second position, and the first contrast value Con1 corresponding to the first position may be smaller than the second contrast value Con2 corresponding to the second position.

Referring to FIG. 3C, the first position and the second position in FIG. 6 may correspond to the situation where the operation proceeds from operation 327 to operation 329. At operation 327, the processor 120 may identify that Con1 is smaller than Con2. According to an embodiment, a case that Con1 is smaller than Con2 means that the first position is positioned farther from the focus position of the external object than the second position. According to various embodiments, the first position and the second position may be interchanged with each other, and this may correspond to the situation where the operation proceeds from operation 327 to operation 337 in FIG. 3C. According to an embodiment, the position of the at least some of the lenses is not limited to the first position and the second position in FIG. 6.

Referring to FIG. 6, the target positions (e.g., the first target position 601, the second target position 603, the third target position 605, and the fourth target position 607 may be determined, and the AF modes (e.g., the first mode, the second mode, and the third mode in FIG. 3B) may be selected corresponding to the determined target position.

According to an embodiment, the processor 120 may apply the DFD method based on the first image corresponding to the first position and the second image corresponding to the second position, and may determine the target position.

According to an embodiment, if the target position is determined as the first target position 601, the processor 120 may select the third mode of the AF modes. According to an embodiment, the first target position 601 may correspond to the movement direction of the at least some of the lenses in accordance with the DFD method, which may be the direction in which the contrast value becomes smaller. In this case, it may be difficult to trust the first target position 601, and the processor 120 may select the third mode of the AF modes. According to an embodiment, if the target position is determined as the first target position 601, the processor 120 may adjust the position of the at least some of the lenses in accordance with the contrast AF method corresponding to the third mode.

According to an embodiment, if the target position is determined as the second target position 603 or the third target position 605, the processor 120 may select the first mode of the AF modes. According to an embodiment, at operation 329 of FIG. 3C, if the target position is closer to the focus position of the external object than the first position, and at operation 331, if the distance between the target position and the second position is smaller than the second threshold value 632, the target position may be determined as the second target position 603 or the third target position 605. According to an embodiment, a case that the target position is the second target position 603 or the third target position 605 may correspond to a situation in which an appropriate defocus difference is incurred in the photographed image, and may correspond to a situation in which the accuracy on the target position is high. According to an embodiment, if the target position is determined as the second target position 603 or the third target position 605, the processor 120 may move the position of the at least some of the lenses to the target position in accordance with the DFD method corresponding to the first mode, and may adjust the position of the at least some of the lenses in accordance with the contrast AF method.

According to an embodiment if the target position is determined as the fourth target position 607, the processor 120 may select the second mode of the AF modes. According to an embodiment, if the distance between the target position and the second position at operation 331 of FIG. 3C is larger than the second threshold value 632, the target position may be determined as the fourth target position 607. According to an embodiment, a case that the target position is the fourth target position 607 may correspond to a situation in which an appropriate defocus difference is incurred in the photographed image, but may correspond to a situation in which the accuracy on the target position is not high. According to an embodiment, if the target position is determined as the fourth target position 607, the processor 120 may adjust the position of the at least some of the lenses in accordance with the contrast AF method while moving the position of the at least some of the lenses to the movement direction corresponding to the fourth target position 607 in accordance with the DFD method corresponding to the second mode.

An electronic device according to various embodiments of the disclosure may include a camera (e.g., camera module 180 of FIG. 1) including a lens assembly (e.g., lens assembly 210 of FIG. 2) including one or more lenses and a driving unit (e.g., image signal processor 260 of FIG. 2) capable of adjusting a focus by moving at least some of the lenses of the lens assembly 210, a memory (e.g., memory 130 of FIG. 1), and a processor (e.g., processor 120 of FIG. 1) operatively connected to the lens assembly 210, the camera 180, and the memory 130. According to an embodiment, the processor 120 may obtain a first image corresponding to a first position of the at least some of the lenses and a second image corresponding to a second position of the at least some of the lenses with respect to an external object using the camera 180, determine conditions related to contrast characteristics with respect to the external object using the first image and the second image, and determine a first movement direction and a movement amount of the at least some of the lenses using the first image, the second image, and a designated point spread function based on the conditions satisfying a designated first condition and adjust the focus on the external object by moving the at least some of the lenses in accordance with the determined first movement direction and the determined movement amount. According to an embodiment, the processor 120 may determine a second movement direction of the at least some of the lenses using a contrast difference between the external object included in the first image and the external object included in the second image based on the conditions satisfying a designated second condition, and adjust the focus on the external object at least based on a contrast change of one or more images obtained while moving the at least some of the lenses along the determined second movement direction.

According to various embodiments, the processor 120 may determine a third movement direction of the at least some of the lenses using the first image, the second image, and the designated point spread function based on the conditions satisfying a designated third condition, and adjust the focus on the external object at least based on the contrast change of the one or more images obtained while moving the at least some of the lenses along the determined third movement direction.

According to various embodiments, the memory 130 may store point spread function information, and the processor 120 may measure a DFD resultant value based on the first image and the second image, measure a cost value corresponding to the first image and the second image based on the measured DFD resultant value and the point spread function information, and determine reliability based on the measured cost value.

According to various embodiments, the processor 120 may determine a target position according to a DFD method, and determine a movement direction and a movement amount of the at least some of the lenses corresponding to the determined target position.

According to various embodiments, the processor 120 may determine whether a difference value between a maximum value and a minimum value of the measured cost value is equal to or larger than a first threshold value, adjust positions of the at least some of the lenses based on the determined target position in case that the difference value is equal to or larger than the first threshold value, and adjust the positions of the at least some of the lenses using the contrast difference between the external objects in case that the difference value is smaller than the first threshold value.

According to various embodiments, the processor 120 may identify the first position and the second position in case that the difference value is equal to or larger than the first threshold value, and compare a distance between the determined target position and the second position with a second threshold value.

According to various embodiments, the processor 120 may adjust the positions of the at least some of the lenses corresponding to the target position in case that the distance is equal to or smaller than the second threshold value, and adjust the focus on the external object at least based on the contrast change of the obtained one or more images.

According to various embodiments, the processor 120 may determine the movement direction of the at least some of the lenses corresponding to the target position in case that the distance exceeds the second threshold value, and adjust the positions of the at least some of the lenses at least based on the contrast change of the determined movement direction and the obtained one or more images.

According to various embodiments, the processor 120 may measure a first contrast value corresponding to the first position and a second contrast value corresponding to the second position, and identify the first position and the second position based on the first contrast value and the second contrast value.

According to various embodiments, a first movement interval at which the at least some of the lenses move based on the first condition may be configured to be smaller than a second movement interval at which the at least some of the lenses move based on the second condition.

According to various embodiments, a method for controlling a focus of camera lenses in an electronic device (e.g., electronic device 101 of FIG. 1), may include: obtaining a first image corresponding to a first position of at least some of the lenses and a second image corresponding to a second position of the at least some of the lenses with respect to an external object using a camera 180 including one or more lenses; determining conditions related to contrast characteristics with respect to the external object using the first image and the second image; determining a first movement direction and a movement amount of the at least some of the lenses using the first image, the second image, and a designated point spread function based on the conditions satisfying a designated first condition, and adjusting the focus on the external object by moving the at least some of the lenses in accordance with the determined first movement direction and the determined movement amount; and determining a second movement direction of the at least some of the lenses using a contrast difference between the external object included in the first image and the external object included in the second image based on the conditions satisfying a designated second condition, and adjusting the focus on the external object at least based on a contrast change of one or more images obtained while moving the at least some of the lenses along the determined second movement direction.

The invention claimed is:

1. An electronic device comprising:
a camera including a lens assembly including one or more lenses and a driving unit capable of adjusting a focus by moving at least some of the lenses of the lens assembly;
a memory; and
a processor operatively connected to the lens assembly, the camera, and the memory,
wherein the processor is configured to:
obtain a first image corresponding to a first position of the at least some of the lenses and a second image corresponding to a second position of the at least some of the lenses with respect to an external object using the camera,
determine conditions related to contrast characteristics with respect to the external object using the first image and the second image,
determine a first movement direction and a movement amount of the at least some of the lenses using the first image, the second image, and a designated point spread function based on the conditions satisfying a designated first condition, and adjust the focus on the external object by moving the at least some of the lenses in accordance with the determined first movement direction and the determined movement amount, and
determine a second movement direction of the at least some of the lenses using a contrast difference between the external object included in the first image and the external object included in the second image based on the conditions satisfying a designated second condition, and adjust the focus on the external object at least based on a contrast change of one or more images obtained while moving the at least some of the lenses along the determined second movement direction.

2. The electronic device of claim 1, wherein the processor is configured to:
determine a third movement direction of the at least some of the lenses using the first image, the second image, and the designated point spread function based on the conditions satisfying a designated third condition, and
adjust the focus on the external object at least based on the contrast change of the one or more images obtained while moving the at least some of the lenses along the determined third movement direction.

3. The electronic device of claim 1,
wherein the memory stores point spread function information, and
wherein the processor is configured to:
measure a DFD resultant value based on the first image and the second image,
measure a cost value corresponding to the first image and the second image based on the measured DFD resultant value and the point spread function information, and
determine reliability based on the measured cost value.

4. The electronic device of claim 3, wherein the processor is configured to:
   determine a target position according to a DFD method, and
   determine a movement direction and a movement amount of the at least some of the lenses corresponding to the determined target position.

5. The electronic device of claim 4, wherein the processor is configured to:
   determine whether a difference value between a maximum value and a minimum value of the measured cost value is equal to or larger than a first threshold value,
   adjust positions of the at least some of the lenses based on the determined target position in case that the difference value is equal to or larger than the first threshold value, and
   adjust the positions of the at least some of the lenses using the contrast difference between the external objects in case that the difference value is smaller than the first threshold value.

6. The electronic device of claim 5, wherein the processor is configured to:
   identify the first position and the second position in case that the difference value is equal to or larger than the first threshold value,
   compare a distance between the determined target position and the second position with a second threshold value,
   adjust the positions of the at least some of the lenses corresponding to the target position in case that the distance is equal to or smaller than the second threshold value, and adjust the focus on the external object at least based on the contrast change of the obtained one or more images, and
   determine the movement direction of the at least some of the lenses corresponding to the target position in case that the distance exceeds the second threshold value, and adjust the positions of the at least some of the lenses at least based on the contrast change of the determined movement direction and the obtained one or more images.

7. The electronic device of claim 6, wherein the processor is configured to:
   measure a first contrast value corresponding to the first position and a second contrast value corresponding to the second position, and
   identify the first position and the second position based on the first contrast value and the second contrast value.

8. The electronic device of claim 1, wherein a first movement interval at which the at least some of the lenses move based on the first condition is configured to be smaller than a second movement interval at which the at least some of the lenses move based on the second condition.

9. A method for controlling a focus of camera lenses in an electronic device, the method comprising:
   obtaining a first image corresponding to a first position of at least some of the lenses and a second image corresponding to a second position of the at least some of the lenses with respect to an external object using a camera including one or more lenses;
   determining conditions related to contrast characteristics with respect to the external object using the first image and the second image;
   determining a first movement direction and a movement amount of the at least some of the lenses using the first image, the second image, and a designated point spread function based on the conditions satisfying a designated first condition, and adjusting the focus on the external object by moving the at least some of the lenses in accordance with the determined first movement direction and the determined movement amount; and
   determining a second movement direction of the at least some of the lenses using a contrast difference between the external object included in the first image and the external object included in the second image based on the conditions satisfying a designated second condition, and adjusting the focus on the external object at least based on a contrast change of one or more images obtained while moving the at least some of the lenses along the determined second movement direction.

10. The method of claim 9, further comprising:
    determining a third movement direction of the at least some of the lenses using the first image, the second image, and the designated point spread function based on the conditions satisfying a designated third condition, and
    adjusting the focus on the external object at least based on the contrast change of the one or more images obtained while moving the at least some of the lenses along the determined third movement direction.

11. The method of claim 9, further comprising:
    storing point spread function information in a memory of the electronic device;
    measuring a DFD resultant value based on the first image and the second image;
    measuring a cost value corresponding to the first image and the second image based on the measured DFD resultant value and the point spread function information; and
    determining reliability based on the measured cost value.

12. The method of claim 11, wherein determining the movement direction and the movement amount of the at least some of the lenses comprises:
    determining a target position according to a DFD method; and
    determining a movement direction and a movement amount of the at least some of the lenses corresponding to the determined target position.

13. The method of claim 12, wherein adjusting the focus on the external object comprises:
    determining whether a difference value between a maximum value and a minimum value of the measured cost value is equal to or larger than a first threshold value;
    adjusting positions of the at least some of the lenses based on the determined target position in case that the difference value is equal to or larger than the first threshold value; and
    adjusting the positions of the at least some of the lenses using the contrast difference between the external objects in case that the difference value is smaller than the first threshold value.

14. The method of claim 13, further comprising:
    identifying the first position and the second position in case that the difference value is equal to or larger than the first threshold value;
    comparing a distance between the determined target position and the second position with a second threshold value;
    adjusting the positions of the at least some of the lenses corresponding to the target position in case that the distance is equal to or smaller than the second threshold value, and adjusting the focus on the external object at least based on the contrast change of the obtained one or more images; and determining the movement direction of the at least some of the lenses corresponding to the target position in case that the distance exceeds the second threshold value, and adjusting the positions of the at least some of the lenses at least based on the contrast change of the determined movement direction and the obtained one or more images.

15. The method of claim 9, wherein a first movement interval at which the at least some of the lenses move based on the first condition is smaller than a second movement interval at which the at least some of the lenses move based on the second condition.

\* \* \* \* \*